June 10, 1924.
J. B. HENDERSON
GYROSCOPIC COMPASS
Filed Nov. 8, 1919
1,497,660
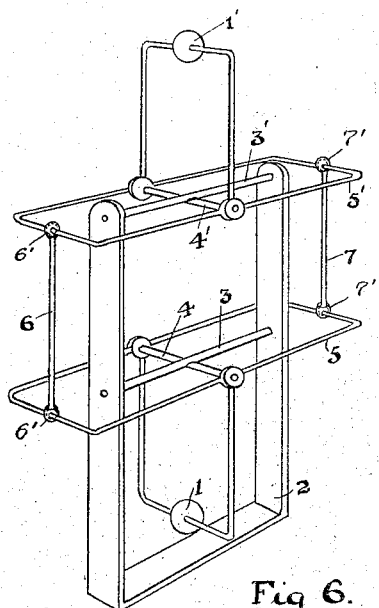
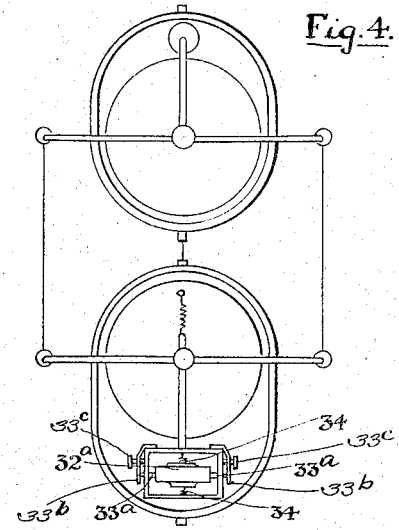
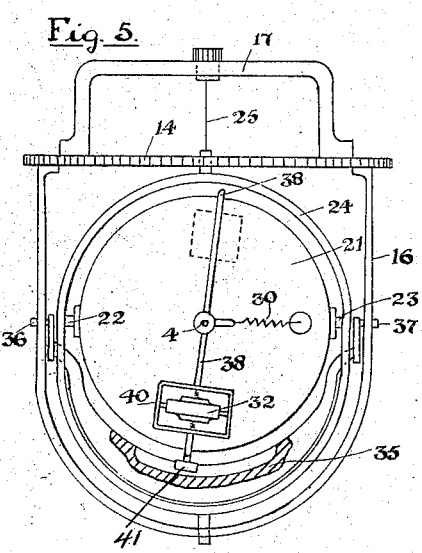
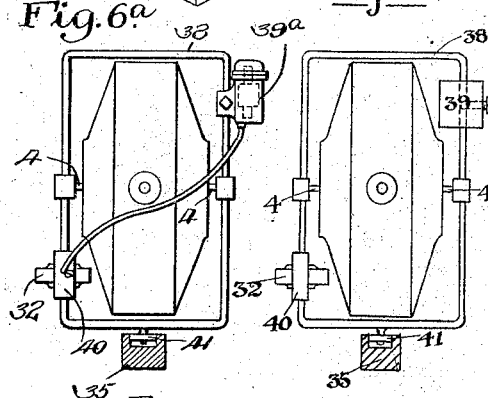
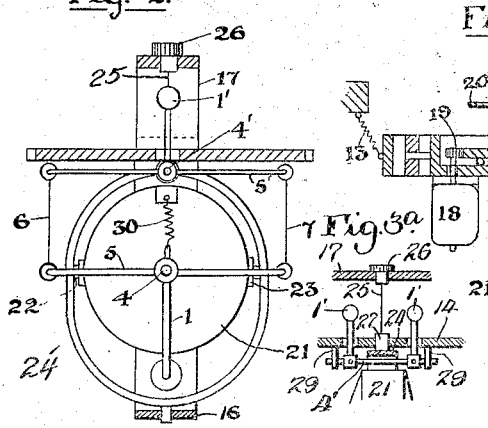
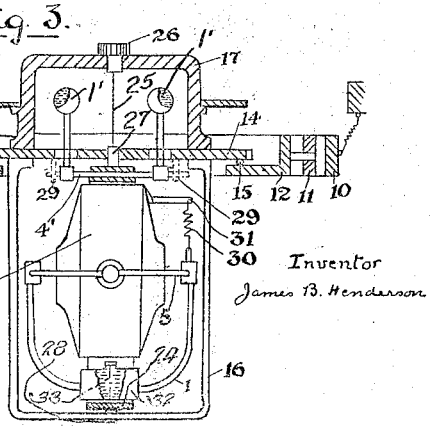
Inventor
James B. Henderson Patented June 10, 1924.

1,497,660

UNITED STATES PATENT OFFICE.

JAMES BLACKLOCK HENDERSON, OF LEE, ENGLAND.

GYROSCOPIC COMPASS.

Application filed November 8, 1919. Serial No. 336,623.

(GRANTED UNDER THE PROVISIONS OF THE ACT OF MARCH 3, 1921, 41 STAT L., 1313.)

*To all whom it may concern:*

Be it known that I, JAMES BLACKLOCK HENDERSON, subject of the King of Great Britain, residing at 2 Cambridge Road, Lee, in the county of Kent, England, have invented certain new and useful Improvements in and Relating to Gyroscopic Compasses (for which I have filed an application in England, No. 7813, July 12, 1916), of which the following is a specification.

My invention relates to improvements in gyro-compasses with the object of reducing the deviation of the compass due to rolling of the ship. The oscillatory motion of the ship when on an inter-cardinal course causes the point of suspension of the compass to oscillate backwards and forwards in a direction inclined to the meridian. The component motion in the E—W direction causes the compass to oscillate on its gimbals as a pendulum and the component motion in the N—S direction causes the gravity control on the gyroscope to impart periodic N—S impulses to the gyroscope while deflected in the E—W vertical plane and these impulses have a moment of the same sign about the vertical, thus producing an effect equivalent to a steady torque about the vertical and deflecting the compass as is described in my copending application Serial No. 336,627, filed Nov. 8, 1919. In that patent I described how the deviation could be reduced by applying the gravity control by means of a pendulum having a long period of oscillation in the E—W vertical plane, the pendular system being practically in neutral equilibrium with respect to the E—W vertical plane.

This invention applies to a compass having such a pendular control system and has for its object to still further reduce the deviation due to rolling of the ship and to avoid some secondary errors introduced by the applications of the long period pendulum.

My invention consists in providing a spring control of the pendular system adapted to fix the normal position of the pendular system relatively to the directing gyroscope or gyroscopes, and further in providing in combination therewith a damping device forming part of the pendular system which may also be utilized to damp the oscillations of the compass about the meridian.

In the accompanying drawings,

Fig. 1 illustrates diagrammatically the principle upon which a pendular system to which my invention may be applied is based.

Figs. 2 and 3 show two elevations of a gyro-compass having a single gyroscope to which the invention is applied.

Fig. 3ª is a view of the upper portion of a modified form of the instrument of Figs. 2 and 3.

Fig. 4 shows the pendular system of Fig. 1 arranged in accordance with my invention.

Figs. 5 and 6 show two elevations of an arrangement for applying my invention to a compass of the well-known Sperry type, and Fig. 6ª is a view similar to Fig. 6 showing a modified arrangement.

In Fig. 1 the pendulum 1 is universally supported in the frame 2 by the crossed spindles 3—4. The pendulum has a rectangular wire frame 5 rigidly attached to it. A similar pendulum 1' is universally supported in the inverted position in the frame 2 by the crossed spindles 3'—4' and has a similar rectangular frame 5' attached to it. The frames 5 and 5' are linked together by the connecting links 6 and 7 which may be tension links made of cord or wire as shown in Fig. 1 or compression links with joints 6' and 7', as in Fig. 1 at their ends of the cone and cup or sphere and cup type so as to leave the pendulums free to incline relatively to each other about the axes 3 and 3' but to keep them always parallel in their inclination about the axes 4 and 4'. In some applications the spindle 3' may be rigidly attached to the frame 2. It is evident that the system is in neutral equilibrium with respect to inclination about the axes 4 and 4'. This system as illustrated is similar to the one I have described in my copending application Serial No. 130,407 filed Nov. 9, 1916, in which it is applied to a particular arrangement of two gyroscopes. My invention may be applied to such a system or it may be applied to a similar pendular control system of gyro-compasses having one or more gyroscopes.

Figs. 2 and 3 show two elevations in part section of a method of applying this system of pendulums to a gyro-compass having only one directing gyroscope. The gimbal rings 10, 11 and 12 are supported in the binnacle by the springs 13 in the ordinary way. The ring 12 carries the "following element" of the compass which consists of the plate 14 turning on the ball bearing 15, the frame 16 and the bridge piece 17. The ring 12 also carries the following motor 18 which drives the following element by means of the pinion 19 gearing with teeth on the periphery of the plate 14. The compass card 20 may be fixed to the bridge piece 17 or it may alternatively be fixed to any other suitable part of the "following element".

The "sensitive element" consists of the gyroscope in its case 21 supported on horizontal trunnions 22 and 23 in the gimbal ring 24, which is suspended by the wire 25 from the torsion head 26 in the bridge piece 17. The vertical trunnions 27 and 28 serve to keep the gimbal ring 24 central in the following element.

The lower pendulum 1 is supported on an axis 4 projecting from the gyro case 21 coaxial with the rotor. The rectangular frame 5 is rigidly attached to the pendulum as in Fig. 1. The upper pendulum 1' is shown double to maintain symmetry of design the two pendulums 1' being rigidly attached to the spindle 4' which is pivoted in the gimbal ring 24. Alternatively the spindle 4' may be pivoted on two brackets 29 attached to the plate 14, as is shown in Fig. 3ª, in which case the spindle would not touch the gimbal ring 24. The two pendulums 1 and 1' are connected by the links 6 and 7 as in Fig. 1. It will be noted that the pendulums 1' are forced to partake of the oscillation in the meridian of the compass as a whole on its gimbals whereas the lower pendulum 1 being carried by the gyroscope does not partake in these oscillations, the connections 6 and 7 permitting such relative movement, but causing the upper and lower pendulums to oscillate together in the plane of the rotor.

In order to prevent the pendulums 1 and 1' deviating far from the vertical in the E—W vertical plane in accordance with my invention I constrain their motion in this plane by a light spring 30 one end of which is attached to the pendulum 1 and the other end to a pin 31 fixed in the gyro case 21.

To damp the oscillations of the pendular system in the E—W vertical plane I may also, in accordance with my invention, make the bob of the pendulum 1 in the form of a hollow cylinder 32 which I fill almost completely with a viscous fluid. I may employ the same fluid to damp the oscillations of the compass about the meridian by interposing a central diaphragm 33 across the cylindrical vessel and by providing this central diaphragm with suitable apertures to adjust the velocity of flow of the fluid between the two halves of the vessel. The bobs of all three pendulums may be hollow and filled with viscous fluid with the object of damping the oscillation of the pendular system in the E—W vertical plane.

Fig. 4 shows how the arrangement of pendulums, of Fig. 1 is applied to a compass containing two gyros the pendulums being controlled by the spring 30 according to my invention. It also illustrates a method which may be adopted to lengthen the period of oscillation of the pendulum system in the E—W vertical plane due to the light spring control by means of a small auxiliary gyroscope 32ª incorporated in the bob of the pendulum 1, the gyro being mounted on the pendulum on trunnions 33ª and its precession about those trunnions being constrained by two light springs 34 which tend to keep the rotor axis vertical. The damping of the oscillations of the pendular system in the E—W plane, with this arrangement, may conveniently be brought about by adjusting the friction on the trunnion axis 33ª in any suitable manner, as by means of spring fingers 33ᵇ pressed against the ends of the axis by screws 33ᶜ.

In the Sperry compass the gravitational system consists of a pendulum carried by the following mechanism and in a seaway only part of the inertia stresses due to this pendulum are taken by the gyro, hence the gravitational control system is arranged so that the component part of it which acts on the gyroscope shall be in neutral equilibrium in the E—W vertical plane so as to reduce the forced periodic deviation of this component from the true vertical due to the motion of the ship produced by waves.

Figs. 5 and 6 show two elevations of one method by which this may be done.

The gyro case 21 is supported on the trunnions 22 and 23 in the gimbal ring 24 which is suspended on the following element by the wire 25. The bail weight 35 is suspended on trunnions 36 and 37 on the frame 16 of the following element, these trunnions being normally approximately coaxial with the trunnions 22 and 23.

The connection between the "bail-weight" 35 and the gyro case 21 consists in one arrangement of a rigid frame 38 with which the pendulums 1 and 1' of Fig. 1 are combined, the rigid frame 38 being pivoted on the axis 4 coaxial with the rotor axis. This frame carries the little gyroscope 32ª on the frame 40 which forms part of the rigid frame 38 as described in connection with Fig. 4. A counter-balance weight 39 is attached to the frame 40 diagonally opposite the gyro 32ª. A roller 41 pivoted on a vertical spindle attached to the frame 38 engages in a roller path in the "bail weight" 35. The gravitational constraint is imparted to the gyro case by the "bail-weight" 35, through the roller 41 and the frame 38. This roller is normally displaced a small amount to the east side of the vertical centre line of the gyro-case as shown in Fig. 5 in order to produce the damping couples and in accordance with my invention it is constrained in this position by the spring 30. The whole frame 38 is in neutral equilibrium on the pivots 4.

The balance weight might conveniently be constructed in the form of a small transformer 39a capable of supplying low voltage current to the electric motor which drives the small gyroscope 32a. Both the transformer and the gyro frame 40 might be clamped to the frame 38 in an adjustable manner and by moving them along the frame the latter may be balanced on its trunnions.

Having now particularly described and ascertained the nature of my said invention and in what manner the same is to be performed, I declare that what I claim is:—

1. In a gyroscopic compass the combination of a gyroscope, a pendular system associated with the gyroscope and in substantially neutral equilibrium with respect to the E—W vertical plane, and means for fixing the normal position of the pendular system relatively to the gyroscope.

2. In a gyroscopic compass the combination of a gyroscope, a pendular system associated with the gyroscope and in substantially neutral equilibrium with respect to the E—W vertical plane, and a spring for fixing the normal position of the pendular system relatively to the gyroscope.

3. In a gyroscopic compass the combination of a gyroscope, a pendular system associated with the gyroscope and in substantially neutral equilibrium with respect to the E—W vertical plane, means for fixing the normal position of the pendular system relatively to the gyroscope, and means forming part of the pendular system for damping the oscillations of the compass about the meridian.

4. In a gyroscopic compass the combination of a gyroscope, a pendular system associated with the gyroscope and in substantially neutral equilibrium with respect to the E—W vertical plane, and means associated with the pendular system for lengthening its period of oscillation in the said plane, said means comprising a gyroscope having a vertical spinning axis and a horizontal precession axis.

5. In a gyroscopic compass the combination of a gyroscope, a pendular system associated with the gyroscope and in substantially neutral equilibrium with respect to the E—W vertical plane, an auxiliary gyroscope associated with the pendular system and having a horizontal trunnion axis and a substantially vertical spinning axis, and means for constraining precession of the auxiliary gyroscope about its trunnion axis.

6. In a gyroscopic compass the combination of a rotor bearing casing, means for mounting said casing so as to be free to turn about a vertical axis and for oscillation about a horizontal axis, a pendulum mounted on said means independently of said casing, a coupling between the pendulum and the casing which is movable with respect to the casing in a plane substantially parallel to the plane of rotation of the rotor, and means connected to the pendulum for constraining the position of the coupling.

7. In a gyroscopic compass the combination of a rotor bearing casing, means for mounting said casing so as to be free to turn about a vertical axis and for oscillation about a horizontal axis, a pendulum mounted on said means independently of said casing, a coupling between the pendulum and the casing which is movable with respect to the casing in a plane substantially parallel to the plane of rotation of the rotor, and a spring connected to the pendulum for constraining the position of the coupling.

8. In a gyroscopic compass a rotor, a casing therefor pivotally supported in neutral equilibrium about a horizontal axis, a pendulous mass supported adjacent to the casing, a movable connection between the mass and the casing including a gyroscope, and means for constraining the point of contact between the connection and the casing.

9. In a gyroscopic compass, the combination of a rotor, a casing therefor, a frame surrounding the casing and mounted coaxially with respect to the rotor axis, a pendulous mass supported adjacent to the lower edge of the rotor casing, a movable connection between the mass and the frame, and a counterbalancing weight mounted upon the frame above the axis thereof.

10. In a gyroscopic compass the combination of a rotor, a casing therefor, a frame surrounding the casing and mounted coaxially with respect to the rotor axis, a pendulous mass supported adjacent to the lower edge of the rotor casing, an auxiliary gyroscope mounted upon the frame below the axis thereof, a movable connection between the mass and the frame, and means mounted upon the frame above the axis thereof for counterbalancing the auxiliary gyroscope.

11. In a gyroscopic compass the combination of a rotor, a casing therefor, a frame surrounding the casing and mounted coaxially with respect to the rotor axis, a pendulous mass supported adjacent to the lower edge of the rotor casing, a movable connection between the mass and the frame, an auxiliary gyroscope mounted upon the frame below the axis thereof, and a transformer for the auxiliary gyroscope mounted upon the frame above the axis thereof and serving to counterbalance the auxiliary gyroscope.

12. In a gyroscopic compass the combination of a rotor, a casing therefor, means for mounting said casing so as to be free to turn about a vertical axis and for oscillation about a horizontal axis, a pendulum pivoted to said casing so as to oscillate freely about an axis substantially perpendicular to said horizontal axis but connected to move with the casing about said axis, and means for constraining the position of the pendulum with respect to the axis about which it may freely oscillate.

13. In a gyroscopic compass the combination of a rotor, a casing therefor, means for mounting said casing so as to be free to turn about a vertical axis and for oscillation about a horizontal axis, a pendulum pivoted to said casing so as to oscillate freely about an axis substantially perpendicular to the horizontal axis but connected to move with the frame about said axis, an auxiliary gyroscope connected with the pendulum for stabilizing it about its axis of oscillation, and a spring connected to the pendulum for constraining it with respect to its axis of oscillation.

14. In a gyroscopic compass the combination of a rotor, a casing therefor, means for mounting said casing so as to be free to turn about a vertical axis and for oscillation about a horizontal axis, a pendulum pivoted to said casing so as to oscillate freely about an axis substantially perpendicular to said horizontal axis but connected to move with the casing about said axis, and an auxiliary gyroscope mounted on the pendulum upon a substantially horizontal precession axis and with its spinning axis approximately vertical.

15. A gyroscopic compass comprising a rotor, a casing therefor, a ring within which the casing is mounted on a horizontal axis, a pendulous mass below the casing, a mounting for the mass permitting it to move freely about an axis substantially perpendicular to the horizontal axis but connected to move with the casing about said axis, a second pendulous mass mounted in the ring above the casing, and a connection between the two masses arranged to permit the second mass to move in a plane perpendicular to the horizontal axis independently of the first named mass and to cause the second mass to move with the first named mass when the latter moves about an axis perpendicular to the horizontal axis.

Dated this 6th day of October 1919.

JAMES BLACKLOCK HENDERSON.